(12) United States Patent
Conrad

(10) Patent No.: US 9,599,737 B2
(45) Date of Patent: Mar. 21, 2017

(54) SYSTEMS AND METHODS FOR ENHANCING IMAGES OF LOG DATA

(75) Inventor: Christopher J. Conrad, Glen Mills, PA (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 346 days.

(21) Appl. No.: 13/123,531

(22) PCT Filed: Jun. 24, 2009

(86) PCT No.: PCT/US2009/048353
§ 371 (c)(1),
(2), (4) Date: Apr. 10, 2011

(87) PCT Pub. No.: WO2010/151252
PCT Pub. Date: Dec. 29, 2010

(65) Prior Publication Data
US 2012/0089379 A1    Apr. 12, 2012

(51) Int. Cl.
*G01V 1/40* (2006.01)

(52) U.S. Cl.
CPC ...................... *G01V 1/40* (2013.01)

(58) Field of Classification Search
None
See application file for complete search history.

(56) References Cited

U.S. PATENT DOCUMENTS

| | | | |
|---|---|---|---|
| 6,211,678 B1 * | 4/2001 | Hagiwara | 324/338 |
| 6,518,756 B1 | 2/2003 | Morys et al. | |
| 6,678,616 B1 | 1/2004 | Winkler et al. | |
| 8,264,553 B2 * | 9/2012 | Joshi et al. | 348/208.4 |
| 8,600,115 B2 * | 12/2013 | Liu | 382/107 |
| 2004/0124837 A1 | 7/2004 | Prammer et al. | |
| 2004/0196038 A1 | 10/2004 | Kruspe et al. | |
| 2006/0106541 A1 * | 5/2006 | Hassan et al. | 702/6 |
| 2006/0248735 A1 * | 11/2006 | Haugland | 33/304 |

(Continued)

OTHER PUBLICATIONS

Int'l Search Report and Written Opinion, dated Nov. 17, 2009, Appl No. PCT/US09/48353, "Systems and Methods for Enhancing Images of Log Data", filed Jun. 24, 2009, 10 pgs.

(Continued)

*Primary Examiner* — Thai Phan
*Assistant Examiner* — Robert Brock
(74) *Attorney, Agent, or Firm* — Iselin Law PLLC; Benjamin Fite

(57) ABSTRACT

Systems and methods are provided to enhance logging data images. Some system embodiments include a dowhole tool, at least one sensor, and a processing system. The downhole tool gathers two-dimensional logging data while moving through a borehole. The sensor(s) measure at least one characteristic of the downhole tool's operation or environment, such as tool motion, offset distance, borehole geometry, and/or properties of the borehole fluid. Such characteristics can cause smearing or spreading of the tool's logging data measurements. Accordingly the processing system determines a de-spreading function based at least in part on the measured characteristic(s) and applies the de-spreading function to the two-dimensional logging data to obtain an enhanced logging data image, which can be presented to a user via a user interface.

22 Claims, 6 Drawing Sheets

(56) References Cited

U.S. PATENT DOCUMENTS

| | | |
|---|---|---|
| 2008/0300791 A1 | 12/2008 | Sinclair et al. |
| 2009/0030616 A1* | 1/2009 | Sugiura |
| 2010/0198518 A1* | 8/2010 | Ekseth et al. ............... 702/6 |
| 2013/0253835 A1* | 9/2013 | Whetton et al. ............. 702/8 |

OTHER PUBLICATIONS

Krist, John E., "WFPC2 Ghosts, Scatter, and PSF Field Dependence", Calibrating HST: Post Servicing Mission, Space Telescope Science Institute, Baltimore, MD, (Aug. 9, 1995), 11 pgs.

Reeves, Stan "Image Deblurring—Introduction", Matlab Central, http://blogs.mathworks.com/steve/2007/08/13/image-deblurring-introduction/, (Aug. 13, 2007), 10 pgs.

Reeves, Stanley J., "A Cross-Validation Approach to Image Restoration and Blur Identification", Georgia Institute of Technology, (Aug. 1990), pp. 1-172.

The Mathworks, "Image Deblurring", http://www.mathworks.com/access/helpdesk/help/toolbox/images/index.html?/access/helpdesk/help/toolbox/images/f9-6010.html and http://www.google.com/search?client=safari&rls=en&q=Image%20Deblurring&ie=UTF-8&oe=UTF-8 (Jul. 30, 3009), 4 pgs.

Wikipedia, "Point Spread Function", http://en.wikipedia.org/wiki/Point_spread_Junction (Jul. 30, 2009), 5 pgs.

PCT International Preliminary Report on Patentability, dated Jan. 12, 2012, Application No. PCT/US2009/048353, "Systems and Methods for Enhancing Images of Log Data", filed Jun. 24, 2009, 6 pgs.

* cited by examiner

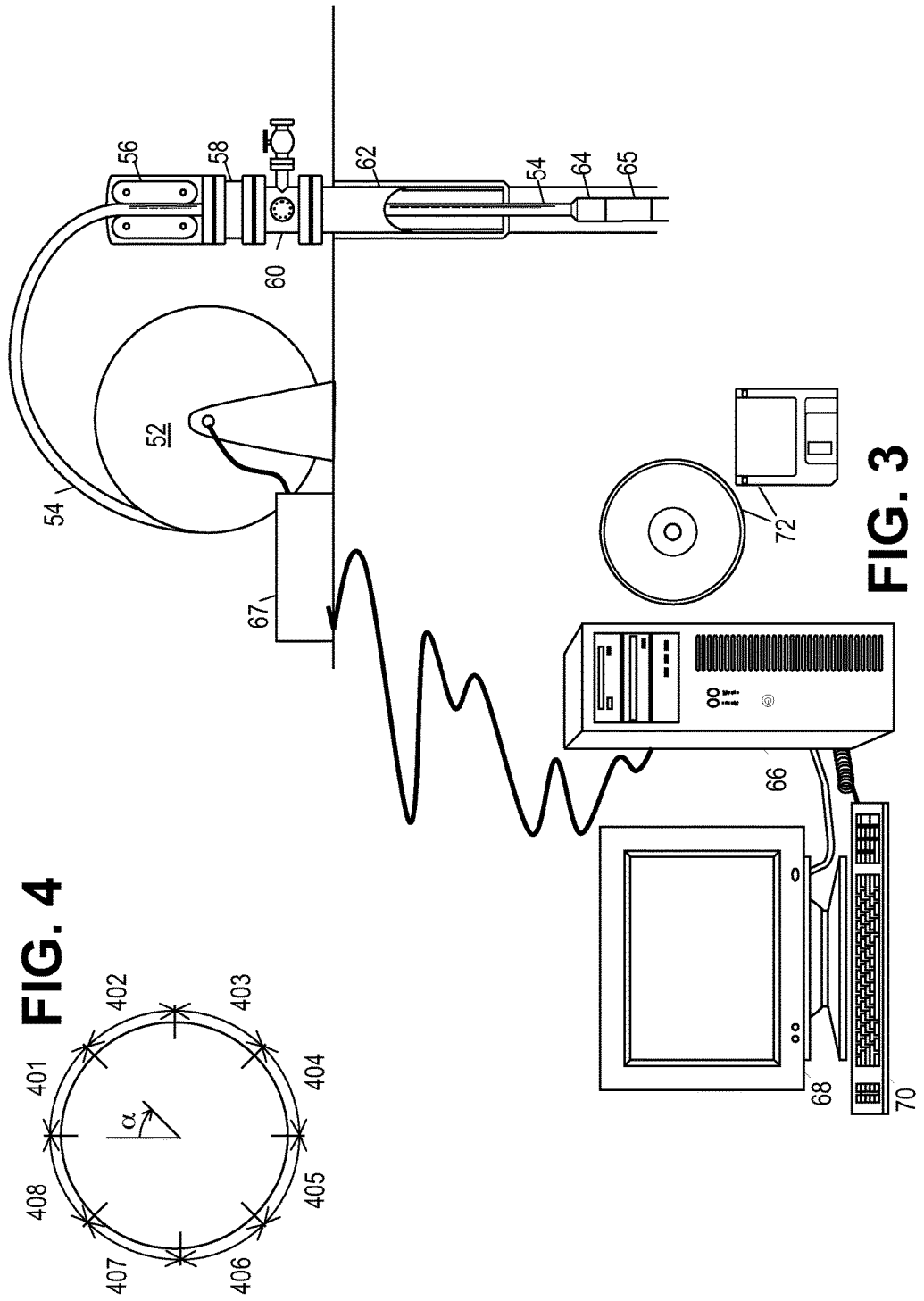

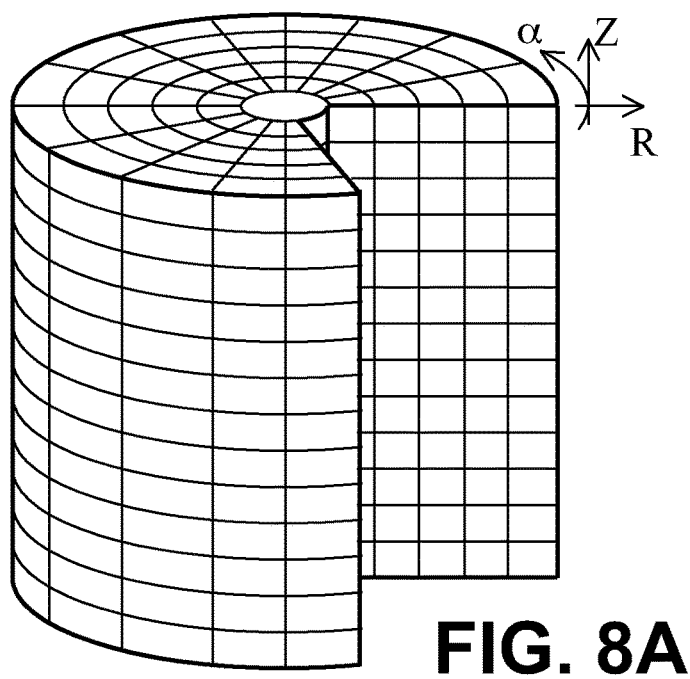
FIG. 8A
FIG. 8B       FIG. 8C
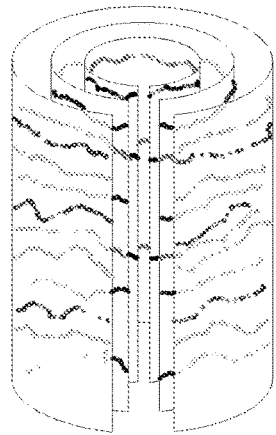 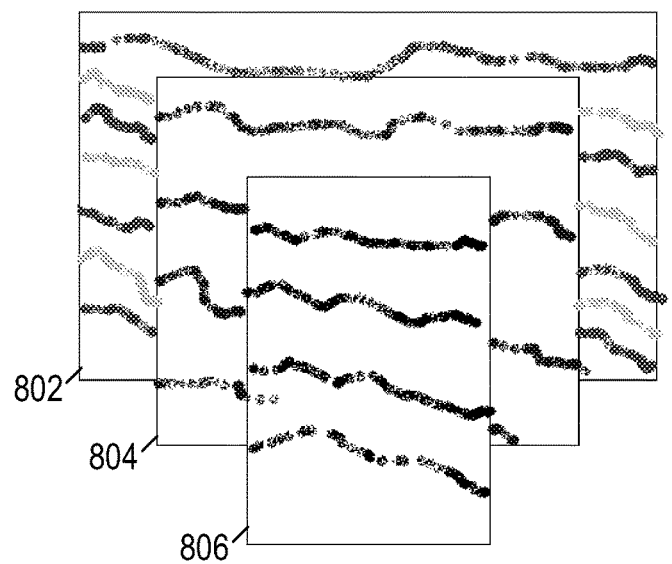

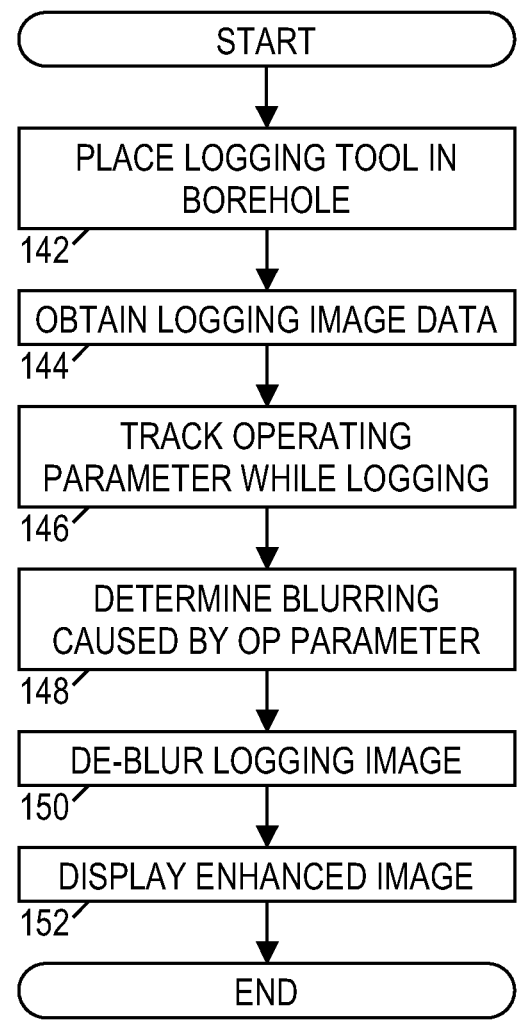

SYSTEMS AND METHODS FOR ENHANCING IMAGES OF LOG DATA

BACKGROUND

Oil field operators demand access to a great quantity of information regarding the parameters and conditions encountered downhole. Such information typically includes characteristics of the earth formations traversed by the borehole as well as data relating to the size and configuration of the borehole itself. The collection of information relating to conditions downhole, which commonly is referred to as "logging," can be performed by several methods including wireline logging and "logging while drilling" (LWD).

In wireline logging, a probe or "sonde" is lowered into the borehole after some or all of the well has been drilled. The sonde hangs at the end of a long cable or "wireline" that provides mechanical support to the sonde and also provides an electrical connection between the sonde and electrical equipment located at the surface of the well. In accordance with existing logging techniques, various parameters of the earth's formations are measured and correlated with the position of the sonde in the borehole as the sonde is pulled uphole.

In LWD, the drilling assembly includes sensing instruments that measure various parameters as the formation is being penetrated, thereby enabling measurements of the formation while it is less affected by fluid invasion. While LWD measurements are desirable, drilling operations create an environment that is generally hostile to electronic instrumentation, telemetry, and sensor operations.

In these and other logging environments, measured parameters are usually recorded and displayed in the form of a log, i.e., a two-dimensional graph showing the measured parameter as a function of tool position or depth. In addition to making parameter measurements as a function of depth, some logging tools also provide parameter measurements as a function of azimuth. Such tool measurements have often been displayed as two-dimensional images of the borehole wall, with one dimension representing tool position or depth, the other dimension representing azimuthal orientation, and the pixel intensity or color representing the parameter value. See, e.g., B. Montaron, U.S. Pat. No. 5,519,668. Such images can appear blurry or smeared due to the conditions under which the logging tool is forced to operate.

BRIEF DESCRIPTION OF THE DRAWINGS

A better understanding of the various disclosed embodiments can be obtained when the detailed description is considered in conjunction with the following drawings, in which:

FIG. 1 is an illustrative environment for logging while drilling ("LWD");

FIG. 3 is an illustrative environment for tubing-conveyed logging;

FIG. 4 shows a borehole circumference divided into azimuthal bins;

FIGS. 8A-8C show one method for rendering 3D logging data as a series of 2D images;

FIG. 11 is a flow diagram of an illustrative image enhancement method.

Figure 2:
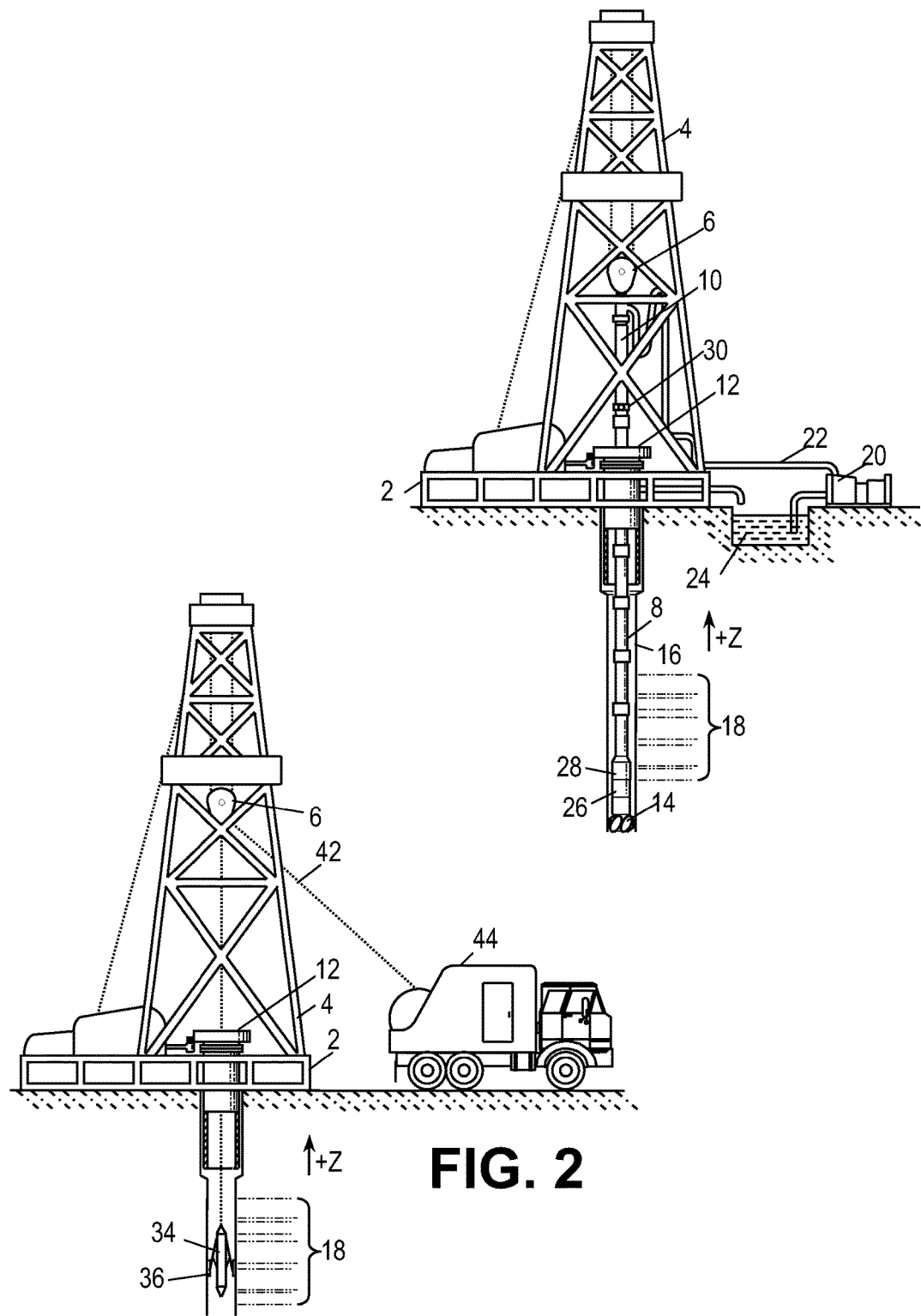
FIG. 2 is an illustrative environment for wireline logging.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

The problems identified in the background are at least partly addressed by disclosed systems and methods of enhancing images of logging data. Some system embodiments include a dowhole tool, at least one sensor, and a processing system. The downhole tool gathers two-dimensional logging data while moving through a borehole. The sensor(s) measure at least one characteristic of the downhole tool's operation or environment, such as tool motion, offset distance, borehole geometry, and/or properties of the borehole fluid. Such characteristics can cause smearing or spreading of the tool's logging data measurements. Accordingly the processing system determines a de-spreading function based at least in part on the measured characteristic(s) and applies the de-spreading function to the two-dimensional logging data to obtain an enhanced logging data image, which can be presented to a user via a user interface.

Some method embodiments include collecting logging data as a function of position and azimuth in a borehole. At least one environmental characteristic affecting measurements of the logging data is tracked during the logging process or reconstructed afterwards. A point spread function, i.e., a function that models the effect of the environmental characteristic on the logging data, is found and converted into a de-spreading function that varies as a function of position. (The point spread function may be a function of position, velocity, acquisition timing, instrumentation error, and other operating parameters.) The de-spreading function is applied to the collected logging data to obtain an enhanced image.

The disclosed systems and methods are best understood in the context of the larger systems in which they operate. FIG. 1 shows an illustrative logging while drilling (LWD) environment. A drilling platform 2 supports a derrick 4 having a traveling block 6 for raising and lowering a drill string 8. A kelly 10 supports the drill string 8 as it is lowered through a rotary table 12. A drill bit 14 is driven by a downhole motor and/or rotation of the drill string 8. As bit 14 rotates, it creates a borehole 16 that passes through various formations 18. A pump 20 circulates drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole into the pit 24 and aids in maintaining the borehole integrity.

An LWD tool 26 is integrated into the bottom-hole assembly near the bit 14. As the bit extends the borehole through the formations, logging tool 26 collects measurements relating to various formation properties as well as the tool orientation and various other drilling conditions. The logging tool 26 may take the form of a drill collar, i.e., a thick-walled tubular that provides weight and rigidity to aid the drilling process. A telemetry sub 28 may be included to transfer tool measurements to a surface receiver 30 and to receive commands from the surface. In some embodiments, the telemetry sub 28 does not communicate with the surface, but rather stores logging data for later retrieval at the surface when the logging assembly is recovered. In both approaches, limitations are placed on the amount of data that can be collected and stored or communicated to the surface.

At various times during the drilling process, the drill string 8 may be removed from the borehole as shown in FIG. 2. Once the drill string has been removed, logging operations can be conducted using a wireline logging tool 34, i.e., a sensing instrument sonde suspended by a cable 42 having conductors for transporting power to the tool and telemetry from the tool to the surface. A wireline logging tool 34 may have pads 36 and/or centralizing springs to maintain the tool near the axis of the borehole as the tool is pulled uphole. A logging facility 44 collects measurements from the logging tool 34, and includes a computer system for processing and storing the measurements gathered by the logging tool.

Tubing-conveyed logging is an alternative to wireline logging. FIG. 3 shows an illustrative tubing-conveyed logging system in which coiled steel or composite tubing 54 is pulled from a spool 52 by a tubing injector 56 and injected into a well through a packer 58 and a blowout preventer 60. In the well, a supervisory sub 64 and one or more logging tools 65 are coupled to the coil tubing 54 and configured to communicate to a surface computer system 66 via information conduits or cables in the coil tubing 54. Surface electronics 67 may be provided to supply power to logging tool 64 via power conduits in coil tubing 54, and further to serve as a digital-to-analog communications interface between the computer system 66 and the downhole tool assembly.

Surface computer system 66 is configured to communicate with supervisory sub 64 to set logging parameters and collect logging information from the one or more logging tools 65. Surface computer system 66 is preferably configured by software (shown in FIG. 3 in the form of removable storage media 72) to monitor and control downhole instruments 64, 65. System 66 includes a display device 68 and a user-input device 70 to allow a human operator to interact with the system control software 72. In at least some embodiments the computer system collects logging data as a function of position and azimuth in the borehole and represents the data in the form of an image.

In each of the foregoing logging environments, the logging tool assemblies preferably include a navigational sensor package that includes directional sensors for determining the inclination angle, the horizontal angle, and the rotational angle (a.k.a. "tool face angle") of the bottom-hole assembly ("BHA"). As is commonly defined in the art, the inclination angle is the deviation from vertically downward, the horizontal angle is the angle in a horizontal plane from true North, and the tool face angle is the orientation (rotational about the tool axis) angle from the high side of the wellbore. In accordance with known techniques, wellbore directional measurements can be made as follows: a three axis accelerometer measures the earth's gravitational field vector relative to the tool axis and a point on the circumference of the tool called the "tool face scribe line". (The tool face scribe line is typically drawn on the tool surface as a line parallel to the tool axis.) From this measurement, the inclination and tool face angle of the BHA can be determined. Additionally, a three axis magnetometer measures the earth's magnetic field vector in a similar manner. From the combined magnetometer and accelerometer data, the horizontal angle of the BHA may be determined.

Moreover, the logging tool assemblies in each of the foregoing environments preferably includes a logging instrument that, alone or in combination with other instruments, measures at least one formation parameter as a function of tool depth (or position along the borehole), azimuth, and in some cases, radial distance from the borehole axis. Such measurements may be made, e.g., by an azimuthally sensitive resistivity logging tools, some of which have multiple depths of investigation. Other suitable logging tools may include a "borehole radar" assembly that detects reflections of high-frequency electromagnetic waves, or ultrasonic imaging tools that similarly detect reflections of acoustic impulses. Certain proposed nuclear logging tools will also provide formation property measurements as a function of position, azimuth, and radial distance. Of course, data from multiple tools can also be combined to further characterize formation properties.

As such logging tools progress along the borehole, they rotate, employ an azimuthally-distributed array, and/or direct azimuthally-steerable sensors to collect measurements as a function of azimuth. Typically the tool divides the circumference of the borehole into sectors as shown by illustrative sectors 401-408 in FIG. 4. The number of sectors typically varies between 8 and 128, but these values are by no means limiting. Similarly, the borehole length is often divided into intervals between 1 cm and 30 cm long, depending on the resolution of the tool. For each cell in the resulting coordinate grid, the tool collects one or more measurements and forms a log data value that represents some estimate of a formation property in that cell.

Figure 5:
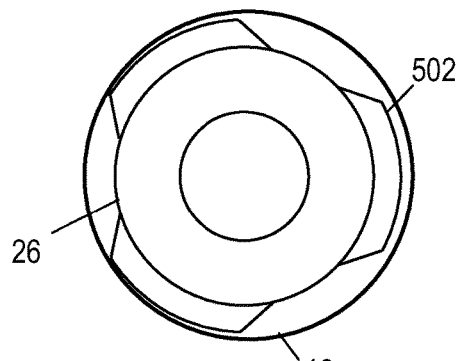
FIG. 5 is a cross-section of an illustrative LWD tool in a borehole.

In many cases, the tool makes many measurements associated with a given cell and averages or combines them in some fashion to obtain the data value that is recorded for that cell. For example, FIG. 5 shows an illustrative LWD tool 26 that rotates many times per minute (e.g., 100 rpm) while the drill string inches forward at 5 cm/min or less. The tool includes so-called "contact" sensors which are designed to maintain contact (or a small, fixed standoff) with the borehole wall. The sensors located on the three stabilizers 502 can easily sweep past each cell over 60 times, in some cases making multiple measurements per sweep. (In other cases, a given sensor is unable to collect a measurement for each sector in a given rotation.) Consequently, the determination of the log data value becomes a statistical exercise, particularly when the motion of the tool during the measurement interval is taken into account. The mathematical rules in assigning measurements to "bins" and the resulting statistical distribution of measurements between cells is herein referred to as "the binning function", and it causes measurements for each cell to be affected by data attributable to adjacent cells, particularly when the effects of errors from the tool's orientation sensor measurements are included.

Note that the stabilizers 502 in FIG. 5 have varying standoffs from the borehole wall 16. Such stabilizers are generally employed to keep the tool near the center of the borehole and thereby minimize the standoff between the external faces of the stabilizers and the borehole wall. Other mechanisms can be employed to minimize such standoff, such as an array of pads mounted on extendable arms or biasing springs. However, even with such mechanisms, borehole irregularities and layers of "mud cake" will cause variable standoffs to occur as the tool's rotation and motion cause each sensing surface to trace a helical path along the borehole wall. As the standoff increases, so does the effective size of the sensor and consequently the tool's measurement resolution is reduced. In an image generated from the log data, the effect of an increased standoff is akin to a blurring due to a camera's focus error, i.e., a focus-induced blurring.

Figure 6:
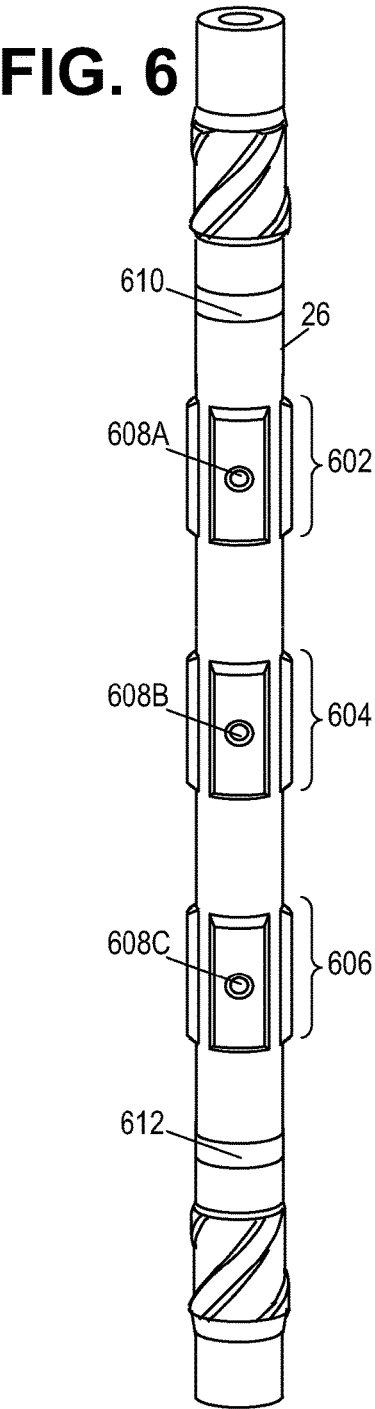
FIG. 6 is an isometric view of a second illustrative LWD tool.

FIG. 6 shows a perspective view of illustrative resistivity imaging tool 26. Tool 26 is a drill collar (a thick-walled steel tubular) having a set 602 of two or more azimuthally-spaced stabilizer protrusions 502 that act to minimize the standoff between the tool's sensing surface(s) and the borehole wall. The illustrative tool 26 includes three axially-spaced stabiliser sets 602, 604, 606, with each set including three azimuthally-spaced stabilizers. Each stabilizer includes a measurement electrode 608, for a total of nine measurement electrodes. As shown, each measurement electrode is positioned on the wall-contacting surface of the stabilizer. In the illustrative implementation, the measurement electrode is about one inch (2.5 cm) in diameter. The width of the insulating gaps around the electrode is no more than 0.2 inches (0.5 cm).

Toroids 610 and 612 each alternate between driving and sensing configurations. In the driving configuration, one of the toroids induces an axial electrical field or current flow. Resistivity-dependent currents escape each of the measurement electrodes and return via the string on the opposite side of the driving toroid. The electrode currents provide azimuthally-sensitive resistivity measurements, while the residual current passing through the other toroid enables a measurement of formation resistivity at the bit. The axial spacing of the electrodes enables resistivity measurements at different depths of investigation, while the alternation of the toroids enables compensated resistivity measurements to be calculated. Due to tool rotation at a rate much greater than the drill bit's rate of penetration, it is expected that one sensing surface at each axial position would be sufficient for compensated resistivity imaging at multiple depths of investigation However, additional sensing surfaces are provided on the other stabilizers for redundancy, and noise reduction. Such additional sensing surfaces enable the tool to function normally even if one of the surfaces is damaged. Moreover, the measurements from such additional surfaces enable the use of signal processing techniques that compensate for noise and individual variation of the sensing surfaces' performance characteristics.

Figure 7:
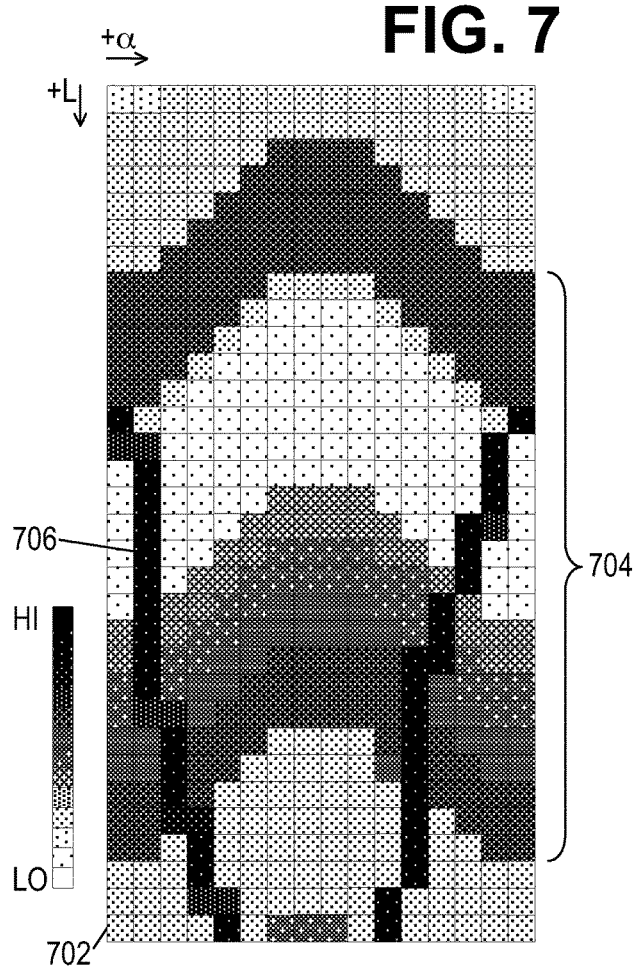
FIG. 7 is an illustrative borehole wall image.

FIG. 7 provides an example of a formation resistivity image 702 formed by associate log data with tool position L and azimuthal orientation α. As previously mentioned, the surface of the borehole wall is divided into "bins", with each bin representing a pair of tool position L and azimuthal orientation α values. Each time the sensing surface passes a bin, it gathers one or more measurements that can be combined with previous measurements for that bin. The combined measurements can then be processed to obtain a resistivity estimate that can be displayed as a pixel color and/or a pixel intensity. Such an image often reveals bedding structures (such as structures 704) and fractures (such as fracture 706). Such features often exhibit a sinusoidal dependence on azimuthal angle, indicating that the borehole encountered the feature at an angle other than 90 degrees. We note here that such features are usually apparent even if the resistivity measurements are only relative in nature rather than precisely accurate.

FIG. 8A shows an illustrative 3D logging data volume that might be collected by a borehole logging tool. In this illustrative volume, the data values are collected as a function of position along the borehole axis (z), azimuth (α), and radius (r) from the borehole axis. Although there are various ways to represent this data volume in the form of two-dimensional images, perhaps the most intuitive way is to treat the data volume as a series of nested cylinders that can be split along one side and flattened as shown in FIGS. 8B and 8C. In FIG. 8C, each of the images 802, 804, and 806 may resemble FIG. 7 in that each cell corresponding to a depth, azimuth coordinate has a color or intensity that represents the log data value for that cell. Image 802 represents the measurements for the largest radius, image 804 represents the measurements for the intermediate radius, and image 806 represents measurements for the smallest radius.

In FIGS. 7 and 8C, the image resolution limited by the physics of the tool (e.g., the size of the sensing surface). However, the actual image resolution can be degraded, causing blurring that is a function of one or more logging conditions such as tool motion (including tool vibration), standoff distance, borehole geometry (e.g., variation in diameter, ellipticity, rugosity), and variations in borehole fluid properties. We note that sensors exist to track such logging conditions, making it possible to obtain a log of tool motion, standoff distance or other logging conditions that can be closely correlated with the logging measurements being collected by the logging tool. Moreover, as most tool manufacturers have models that they use to predict and evaluate tool measurements, the blurring effects of such logging conditions can be readily ascertained.

Figure 9A:
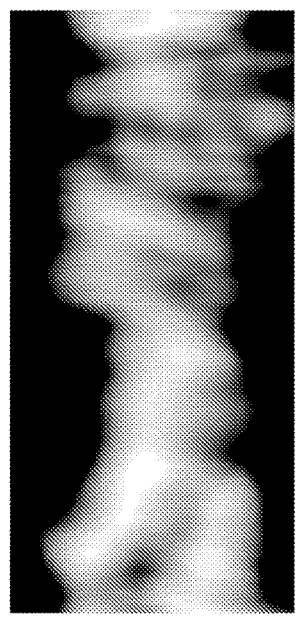
FIGS. 9A-9B show a conceptual illustration of a 2D image before and after enhancement.

FIG. 9A shows a synthesized example of a borehole wall resistivity map in which a tool offset induces blurring. To compensate for such blurring, we begin by formalizing this effect with a mathematical description. In a shift-invariant model, every point in the image is blurred in the same way relative to the "original" unblurred image. This can be expressed as 2D convolution:

$$g(x,y)=h(x,y)**f(x,y)+n(x,y) \quad (1)$$

where f(x,y) is the pixel value at the x, y coordinate pair in the original image, h(x,y) is the so-called point spread function, ** is the 2D convolution operator, n(x,y) is measurement noise, and g(x,y) is the measured (blurred) image. However, the shift-invariance assumption is expected to be approximately true only for small portions of the logging data image. Accordingly, the logging data image can be divided into separate areas over which this assumption is true, or the shift-invariance assumption can be dropped. An alternative formalization that does not require a shift invariance assumption is:

$$g=Hf+n \quad (2)$$

where f is a vector of lexicographically ordered pixel values from the original image, H is a matrix that represents the point spread function, n is the noise vector, and g is the vector of lexicographically ordered pixel values for the blurred image.

Figure 9B:
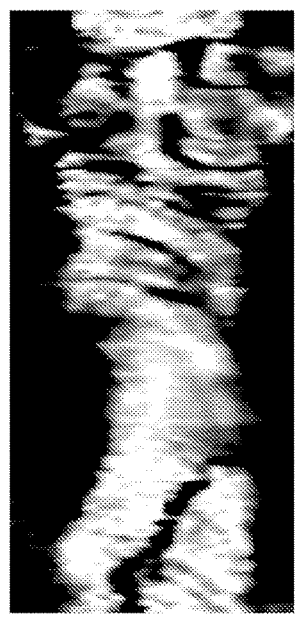

When the point spread function is known, the original image can be estimated by finding the image vector $\hat{f}$ that minimizes $$(g-H\hat{f})^T R(g-H\hat{f}) \quad (3)$$

where R is a diagonal matrix that locally weights the restoration process. (Often R is the identity matrix.) The enhanced image shown in FIG. 9B illustrates the result of such a restoration process. Note that the enhance image shows a much crisper image having a greater amount of detail to aid interpretation.

A more general restoration solution that additionally provides for constraints on the "smoothness" of the solution is described by Stanley J. Reeves, "A Cross-Validation Approach to Image Restoration and Blur Identification", PhD Thesis at Georgia Inst. of Techn., 1990, involves the minimization of:

$$(g-H\hat{f})^T R(g-H\hat{f}) + a(L\hat{f})^T S(L\hat{f}) \quad (4)$$

where S is a diagonal matrix that locally weights the regularization process, L is a matrix representing a regularization operator, and a is a scalar that governs the degree of regularization. Refer to Reeves's thesis for a discussion of methods for selecting optimal regularization operators and weight.

Logging data images are formed in a fashion analogous to scanning a photographic image. A sensing element which is sensitive to some attribute of the formation (electrical current, electric potential, material density, radio-activity, acoustic effect, etc) is typically scanned over both the circumference (as the tool rotates) and measured depth (as the tool moves along the borehole) to form an image log. As with photographic images, logging data images can have their quality and resolution adversely affected by the fact that the tool is in motion or has high standoff (distance from the sensing element to the formation wall) when the formation is sampled. The effects of tool motion are analogous to "motion induced blurring" in photography. The effects of standoff are analogous to "focus induced blurring". As a consequence, it is expected that logging data images can be effectively de-blurred (restored) by applying methods and mathematical processing developed for correcting such blurring effects in photographic images.

However, unlike photographic images, it is possible for logging tool assemblies to accurately measure the parameters that cause blurring and to accurately determine the point spread function a priori, i.e., without having to estimate it based on the image data. In most logging data images the motion induced blurring is primarily a function of how fast the tool turns azimuthally (rotations per minute (RPM) in the hole) and the tool's rate of penetration (ROP) along the borehole. Both of these attributes can be measured to a high degree of precision in downhole imaging systems. RPM can be computed from an imaging tool's internal magnetometers. ROP is known by the depth tracking system in the rig running the logging tool. Similarly, standoff can be measured in several ways. See, e.g., U.S. Pat. No. 6,518,756, "Systems and methods for determining motion tool parameters in borehole logging".

For a downhole imaging tool the point spread function (PSF) would be well described as a function of the sensor function as modified by the sampling function and binning functions to capture the measurements' dependence on RPM, ROP, tool standoff, and other parameters. As used herein, the term "sensor function" refers to a model of a stationary tool's measurement of formation properties. The model captures geometry effects such as instantaneous standoff and other tool and borehole shape parameters. The term "sampling function" refers to a model of the way a sensor response is acquired, filtered and/or integrated over a time interval. This model captures the effects of tool motion and vibration. The deblurring model can also be further enhanced by including the effects of the tool's binning function in the point spread function to account for the way in which measurements are mapped to discrete coordinate bins and accumulated. Often the binning function is sub-optimal due to hardware or software constraints, and it can introduce additional distortions which are a function of the motion parameters.

Figure 10:
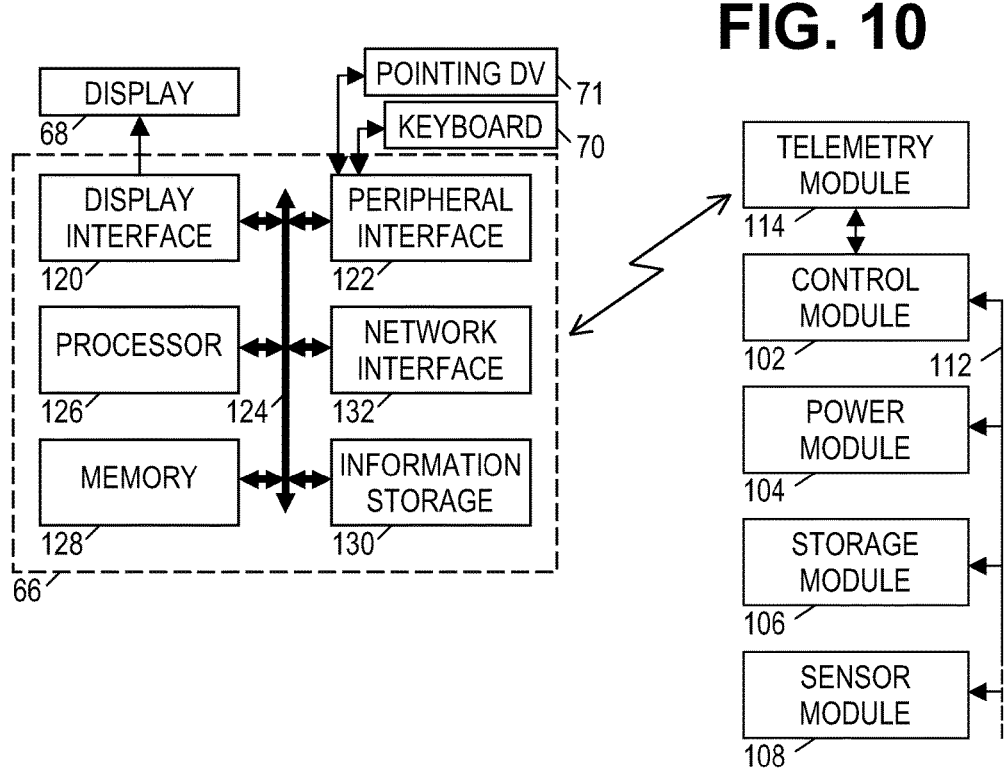
FIG. 10 shows a functional block diagram of an illustrative logging system.

FIG. 10 shows a block diagram of an illustrative logging system which includes a downhole tool assembly (blocks 102-114) and a data processing facility (blocks 66-71). The downhole tool assembly has a control module 102, a power module 104, an optional storage module 106, and one or more logging tools 108. A tool bus 112 enables the control module 102 to communicate with each of the other modules 104-108 to transfer data and control their operations. Control module 102 incorporates or couples to a telemetry module 114 to enable the control module to communicate with a data processing system 66 at the surface. The control module 102 exchanges data with data processing system 66 and receives commands for configuring the operation of the downhole tool assembly.

Power module 104 supplies power to the other modules. To that end, the power module 104 may include an energy storage device such as a bank of batteries, and/or an electrical power generator such as a turbine in the mud flow or a vibrational energy harvester. Optional storage module 106 includes memory for storing logging measurement data until it can be transmitted to the surface or until the tool is recovered and the data can be directly downloaded. Sensor modules 108 represent logging tools for measuring formation characteristics. Other tools and sensors can also be included to measure other formation characteristics or parameters of the drilling operation including tool position and orientation, borehole geometry, and properties of the borehole fluid.

Control module 102 configures the operation of the sensor modules and coordinates the transfer of tool measurement data from the sensor modules to the storage module. In addition, control module 102 sends some or all of the data to the surface for viewing and analysis during the logging process. Telemetry module 114 communicates data to the surface using any suitable LWD telemetry technique including mud pulse telemetry, acoustic telemetry, and electromagnetic telemetry.

The surface processing system collects, processes, and optionally displays an image representing the logging data. In some embodiments, a user may further interact with the system to send command to the bottom hole assembly to adjust its operation in response to the received data. The data processing system can take the form of a computer that includes a chassis 66, a display 68, and one or more input devices 70, 71. Located in the chassis 66 is a display interface 120, a peripheral interface 122, a bus 124, a processor 126, a memory 128, an information storage device 130, and a network interface 132. Bus 124 interconnects the various elements of the computer and transports their communications.

In at least some embodiments, surface telemetry transducers are coupled to the processing system 66 via the network interface 132 to enable the system to communicate with the downhole tool assembly. In accordance with user input received via peripheral interface 122 and program instructions from memory 128 and/or information storage device 130, the processor 126 processes the received telemetry information received via network interface 132 to construct enhanced logging data images and display them to the user.

The processor 126, and hence the system as a whole, generally operates in accordance with one or more programs stored on an information storage medium (e.g., in information storage device 130). Similarly, the downhole tool assembly control module 102 operates in accordance with one or more programs stored in an internal memory. One or more of these programs configures the control module and processing system to carry out at least one of the logging data image enhancement methods disclosed herein.

FIG. 11 is a flow diagram of an illustrative image enhancement method that can be largely carried out by processing system 66. In block 142 a rig operator places a logging tool in the borehole. The logging tool can be part of an LWD bottomhole assembly, a wireline sonde package, or a tubing conveyed logging tool assembly. As the operator moves the logging tool along the borehole, the system collects logging image data in block 144, and further tracks one or more operating parameters in block 146. Such operating parameters might include RPM, ROP, and tool standoff, though other parameters can alternatively or additionally be measured. It is worth noting here that operating parameters can be approximated with certain assumptions, e.g., that the tool lies along the low side of the hole. Thus knowledge of the nominal borehole diameter and tool diameter can be combined to estimate an orientation-dependent tool standoff, enabling rudimentary correction without having continuously measured the position of the tool in the borehole. In block 148, the system determines a point spread function based at least in part on the operating parameters that have been measured or otherwise determined. In block 150, the system applies a restoration process to the logging image data to obtain an enhanced image. In block 152, the system provides the image in a tangible form for user analysis.

Numerous variations and modifications will become apparent to those skilled in the art once the above disclosure is fully appreciated. It is intended that the following claims be interpreted to embrace all such variations and modifications.

What is claimed is:

1. A logging system that comprises:
   a downhole tool that gathers logging data as a function of position and azimuth while moving through a borehole;
   a downhole sensor that measures a blur-inducing logging condition separate from the logging data;
   a processing system that determines a spreading function independently of a logging data image and based at least in part on the measured blur-inducing logging condition, wherein the processing system converts the spreading function to a de-spreading function and applies the de-spreading function to the logging data to obtain an enhanced logging data image; and
   a user interface that makes the enhanced logging data image perceptible to a user.

2. The logging system of claim 1, wherein the blur-inducing logging condition is a standoff distance.

3. The logging system of claim 1, wherein the blur-inducing logging condition is a rate of motion along the borehole axis.

4. The logging system of claim 1, wherein the blur-inducing logging condition is a rate of rotation for the downhole tool.

5. The logging system of claim 1, wherein the spreading function is further based on a sampling function for the downhole tool.

6. The logging system of claim 1, wherein the spreading function is based in part on a binning function for the downhole tool.

7. The logging system of claim 1, wherein the logging data corresponds to acoustic reflectance as a function of distance and azimuth.

8. The logging system of claim 1, wherein the logging data corresponds to resistivity as a function of depth and azimuth.

9. The logging system of claim 8, wherein the logging data is a function of radial distance.

10. A logging method that comprises:
    collecting logging data as a function of position and azimuth in a borehole;
    tracking sensor measurements for a blur-inducing logging condition separate from the logging data;
    finding a point spread function independently of a logging data image and based at least on said blur-inducing logging condition;
    converting the point spread function into a de-spreading function;
    applying, by a processor, the de-spreading function to the logging data to obtain an enhanced logging data image; and
    displaying the enhanced logging data image.

11. The logging method of claim 10, wherein the blur-inducing logging condition is a standoff distance.

12. The logging method of claim 10, wherein the blur-inducing logging condition is a rate of motion along the borehole axis.

13. The logging method of claim 10, wherein the blur-inducing logging condition is a rate of rotation for the downhole tool.

14. The logging method of claim 10, wherein the blur-inducing logging condition is a property of fluid in the borehole.

15. The logging method of claim 10, wherein the logging data is indicative of acoustic impedance.

16. The logging method of claim 10, wherein the logging data is indicative of resistivity.

17. The logging method of claim 10, wherein the point spread function is further based on a binning function.

18. A non-transitory information storage medium having software that comprises:
    a data acquisition module that obtains logging data as a function of position and azimuth, and wherein the data acquisition module further obtains sensor measurements for a blur-inducing logging condition separate from said logging data;
    a modeling module that determines a point spread function independently of a logging data image and based at least in part on said blur-inducing logging condition; and
    a processing module that applies to the logging data a de-spreading function derived from said point spread function to obtain an enhanced image for display to a user.

19. The medium of claim 18, wherein the blur-inducing logging condition includes a standoff distance.

20. The medium of claim 18, wherein the blur-inducing logging condition includes a tool motion.

21. The medium of claim 18, wherein the point spread function is further based on sampling statistics of the logging tool.

22. The medium of claim 18, wherein the point spread function is based at least in part on a binning function.

\* \* \* \* \*